United States Patent [19]
Chino et al.

[11] Patent Number: 5,118,525
[45] Date of Patent: Jun. 2, 1992

[54] METHOD FOR MANUFACTURING MAGNETIC RECORDING MEDIUM WHILE PREVENTING DAMAGE TO SAME CAUSED BY SCRAPING BY COATING HEAD

[75] Inventors: Naoyoshi Chino; Hiromu Ueha, both of Kanagawa, Japan

[73] Assignee: Fuji Photo Film Co., Ltd., Kanagawa, Japan

[21] Appl. No.: 589,573

[22] Filed: Sep. 28, 1990

[30] Foreign Application Priority Data

Sep. 29, 1989 [JP] Japan .................. 1-252441

[51] Int. Cl.⁵ .................. B05D 3/06; B05D 5/12; B05D 5/00
[52] U.S. Cl. .................. 427/44; 427/35; 427/54.1; 427/130; 427/131; 427/284
[58] Field of Search .................. 427/35, 44, 43.1, 54.1, 427/129, 130, 131, 284, 286

[56] References Cited

U.S. PATENT DOCUMENTS

| | | | |
|---|---|---|---|
| 4,297,396 | 10/1981 | Takehara et al. | 427/284 |
| 4,387,114 | 6/1983 | Conner et al. | 427/284 |
| 4,552,798 | 11/1985 | Ryoke et al. | 427/131 |
| 4,552,799 | 11/1985 | Ryoke et al. | 427/131 |
| 4,578,299 | 3/1986 | Kato et al. | 427/131 |
| 4,581,270 | 4/1986 | Kato et al. | 427/131 |
| 4,721,640 | 1/1988 | Kato et al. | 427/131 |
| 4,976,992 | 12/1990 | Chino et al. | 427/284 |

Primary Examiner—Marianne Padgett
Attorney, Agent, or Firm—Sughrue, Mion, Zinn, Macpeak & Seas

[57] ABSTRACT

A method for manufacturing a magnetic recording medium in which shavings are not generated when an easily bent thin web comes into contact with contact members of a coating head, a conveying system, rolls in calendaring treatment, etc., in which, during coating, a coating having an even coating thickness and good surface properties is formed, and in which a coating liquid does not spread in such a manner as to cause defects such as coating unevenness and the like. In accordance with the inventive method, to manufacture a magnetic recording medium in which a coating liquid is applied onto a surface of a continuously running flexible support except widthwise edge portions of the support while a slot top end of a coating head is pressed against the surface of the flexible support, a material selected from a polymer film, a carbon dispersing liquid, a fatty-acid lubricant, and a fluorine-group lubricant is applied onto at least portions of the flexible support corresponding to the edge portions. The material applied to the edge portions of the flexible support is dried to thereby form a coating at the edge portions of the flexible support. The coating liquid is then applied onto the surface of the flexible support.

6 Claims, 2 Drawing Sheets

FIG. 3
FIG. 4
FIG. 5
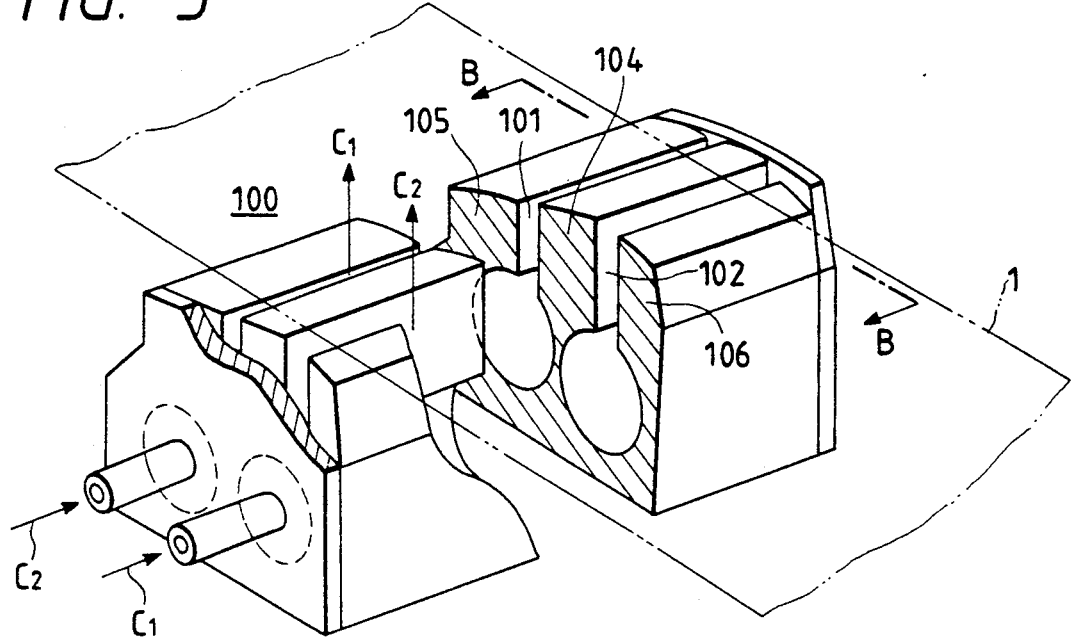
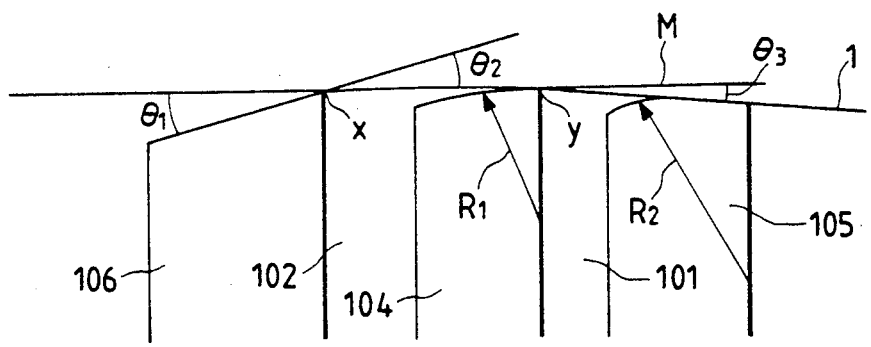
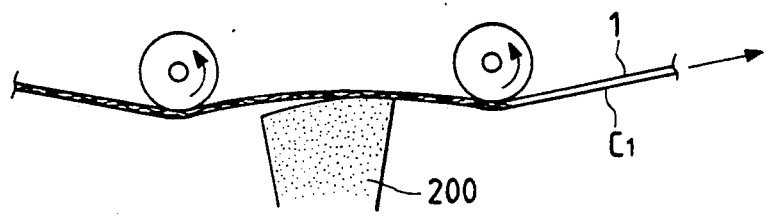

METHOD FOR MANUFACTURING MAGNETIC RECORDING MEDIUM WHILE PREVENTING DAMAGE TO SAME CAUSED BY SCRAPING BY COATING HEAD

BACKGROUND OF THE INVENTION

The present invention relates to a method for manufacturing a magnetic recording medium in which a flexible support (hereinafter referred to a web) made of plastic film, paper, metal foil, or the like, is coated with a coating liquid such as a magnetic liquid, a surface protecting liquid, or the like.

Conventional coating methods for applying a coating liquid onto a web in a process of manufacturing a magnetic recording medium include a roll-type coating method, a bead-type coating method, a curtain-type coating method, and an extrusion-type coating method. In all of those coating methods, a coating liquid is applied to a web across a width thereof narrower the actual width of the web so that, generally, uncoated portions in a range from several mm to several tens of mm remain along the two edges of the web.

Examples of extrusion-type coating apparatuses for applying a coating liquid onto a continuously running web with a coating head pressed against the web are disclosed in Japanese Unexamined Patent Publications Nos. Sho-57-84771, Sho-58-104666, Sho-58-109162, Sho-58-18069, Sho-58-18070, and Sho-60-78664. Japanese Patent Applications Nos. Sho-59-94657 and Sho-61-230173, Japanese Patent Publication No. Sho-45-1459. In these apparatuses, the web, on which lengthwise tension is exerted, is bent so that edge portions thereof are curved toward the coating head side so as to contact the coating head.

Due to this contact with the coating head, powder-like shavings are produced, which ultimately are a cause of dropout in the signal reproduced from the tape. Further, shavings deposited on the contact portion of the coating head with the web, etc., sometimes change the distance between the web and the coating head to thereby make the thickness of the coating liquid at the edge portions uneven.

It has been known that such an effect as caused in the coating head occurs at a doctor bar or a smoother, as disclosed in, for example, Japanese Unexamined Patent Publications Nos. Sho-51-140703, Sho-52-84242, and Sho-54-8646, Japanese Patent Publication Nos. Sho-48-11336 and Sho-60-53674.

In order to solve the foregoing problems, there has been proposed a method for providing a liquid lubricant between the coating head and web, in which, prior to application of the coating liquid, a solvent is applied onto the edge portions of the web to which no coating liquid is applied. Such a method is disclosed, for example, in Japanese Patent Unexamined Publications Nos. Sho-61-257268 and Hei-1-102736.

On the other hand, there has been proposed, as disclosed in, for example, Japanese Patent Unexamined Publication No. Sho-61-257263, Japanese Patent Application No. Sho-63-201996, Japanese Unexamined Patent Publication No. Hei-1-102735, another method in which portions of a coating head or the like corresponding to the edge portions of a web are cut away so as make the distance between the coating head and the web large.

In the conventional coating method in which a solvent is precoated to provide liquid lubrication, however, for example, in the case where a magnetic coating liquid is applied, there is a possibility that the coating liquid will be dissolved into the solvent, so that the quantity and range of coating are limited to thereby make it difficult to apply an extremely small amount of solvent onto the web edge portions. Further, external disturbances such as flapping, meandering, etc., due to running of the web make it difficult to apply the solvent while keeping the boundary fixed between the solvent and the coating liquid. As a result, there has been a problem that the coating liquid is mixed with the solvent so as to spread into the solvent. Further, there has been another problem that, by the above spreading, the magnetic coating liquid adheres to conveyer rolls used for supporting and running the web run, as a result of which the web is fouled by the dirty magnetic coating liquid, or a calender roll in the following surface treating step is also fouled, thus adversely affecting the calendering treatment and thereby degrading the magnetic recording characteristics of the medium.

In the method in which opposite end portions of a coating head are cut away, moreover, shavings are similarly generated by the cut edge portions on the opposite end portions of the coating liquid. While this method is effective at a portion of the coating liquid far away from the end portions of the web, these shavings adhere to the end portions. Further, because of the above-mentioned meandering of the web, it is extremely difficult to make the end portions of the coating layer formed by the coating head coincident with the cut-away positions of a doctor bar of a smoother disposed on the downstream side of o the coating head. Additionally, in the case where the web is thin, for example, not thicker than 30 $\mu$m, and has particularly low rigidity, there has been a problem that the web is easily and greatly bent, so that the desired effects of cutting away end portions of the web cannot be obtained, even if cut-away portions are formed in the coating head or the like at its opposite end portions.

Further, the support is shaved when the running support comes into contact with the conveying system before and after coating, particularly during the calendering treatment, and the shavings so generated can result in undesired effects, for example, dropout during the reproduction of the magnetic recording medium.

SUMMARY OF THE INVENTION

It is therefore an object of the present invention to solve the above-discussed problems in the manufacturing of a magnetic recording medium.

It is another object of the present invention to provide a method for manufacturing a magnetic recording medium in which shavings are not generated when an easily bent thin web comes into contact with contact members of a coating head, a conveying system, rolls in calendering treatment, etc., in which, during coating, a coating having an even coating thickness and good surface properties is formed, and in which a coating liquid does not spread in such a manner as to cause defects such as coating unevenness and the like.

The above and other objects of the present invention can be attained by a method for manufacturing a magnetic recording medium in which a coating liquid is applied onto a surface of a continuously running flexible support except widthwise edge portions of the support while a slot top end of a coating head is pressed against the surface of the flexible support, which is characterized by comprising the steps of: previously applying a material selected from a polymer film, a carbon dispersion, a fatty-acid lubricant, and a fluorine-group lubricant onto at least portions of the flexible support corresponding to the edge portions; drying the material applied to the portions of the flexible support to thereby form a coating at the portions of the flexible support; and applying the coating liquid onto the surface of the flexible support.

The above objects of the present invention can be attained also by a method for manufacturing a magnetic recording medium in which a coating liquid is applied onto a surface of a continuously running flexible support except widthwise edge portions of the support while a slot top end of a coating head is pressed against the surface of the flexible support, which method is characterized by comprising the steps of: using a flexible support including a coating formed on at least end portions of each of the opposite surfaces of the support, the coating being formed of a material which is selected from a polymer film, a carbon dispersion, a fatty-acid lubricant, and a fluorine-group lubricant and which is applied onto the end portions and dried thereat, or being formed of an electron-beam setting or ultraviolet setting monomer liquid which is applied onto the end portions and irradiated with an electron-beam or ultraviolet rays so as to be hardened; or applying a magnetic dispersion onto the flexible support on which said coating has been formed; and causing a lubricant evaporated from the magnetic dispersion in drying the magnetic dispersion to adhere in the form of a layer onto a nonmagnetic layer area on each of the opposite surfaces of the flexible support.

BRIEF DESCRIPTION OF THE DRAWINGS

FIG. 3 is a perspective view of a coating head used in the above embodiment of the present invention;

FIG. 4 shows a vertical section taken on a line B—B in FIG. 3; and

FIG. 5 is a perspective view of a smoother used in the preferred embodiment of the present invention.

DESCRIPTION OF THE PREFERRED EMBODIMENTS

Figure 1:
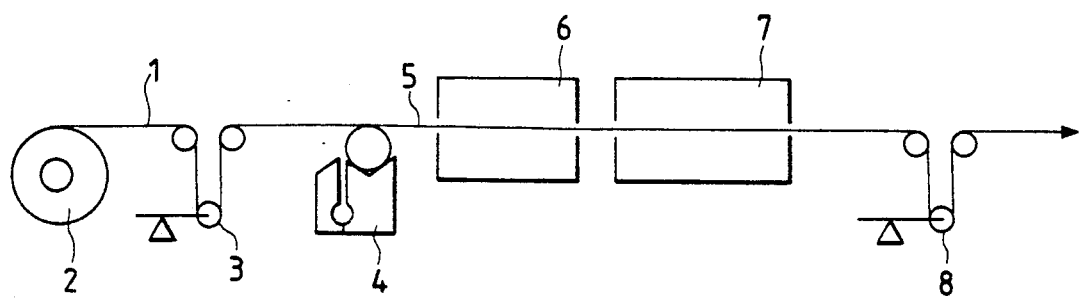
FIG. 1 is a schematic view of a coating apparatus used in a preferred embodiment of the present invention.

Referring to the drawings, a preferred embodiment of a coating apparatus constructed according to the present invention will be described hereunder.

FIG. 1 is a schematic constituent view of equipment for manufacturing magnetic recording media by the use of the manufacturing method according to the present invention.

A continuously running web 1 is fed from a feeding roller 2 and sent to an undercoat-forming coating portion 4 through a suitably disposed tension roll 3 while the web is maintained in a suitably tensed state. An undercoat 5 is formed on the web 1 except edge portions 9 thereof (see FIG. 2). However, the undercoat 5 may be formed on the surface of the web across the whole width of the web or in areas except portions not to be coated with a coating liquid.

After the undercoat 5 is applied on the web 1, the web 1 is sent to an end-portion treating zone 6 (which is a feature of the present invention), sent to an undercoat drying zone 7 in which the undercoat 5 is dried, and then sent to a magnetic dispersion coating stage through a tension roll 8.

Figure 2:
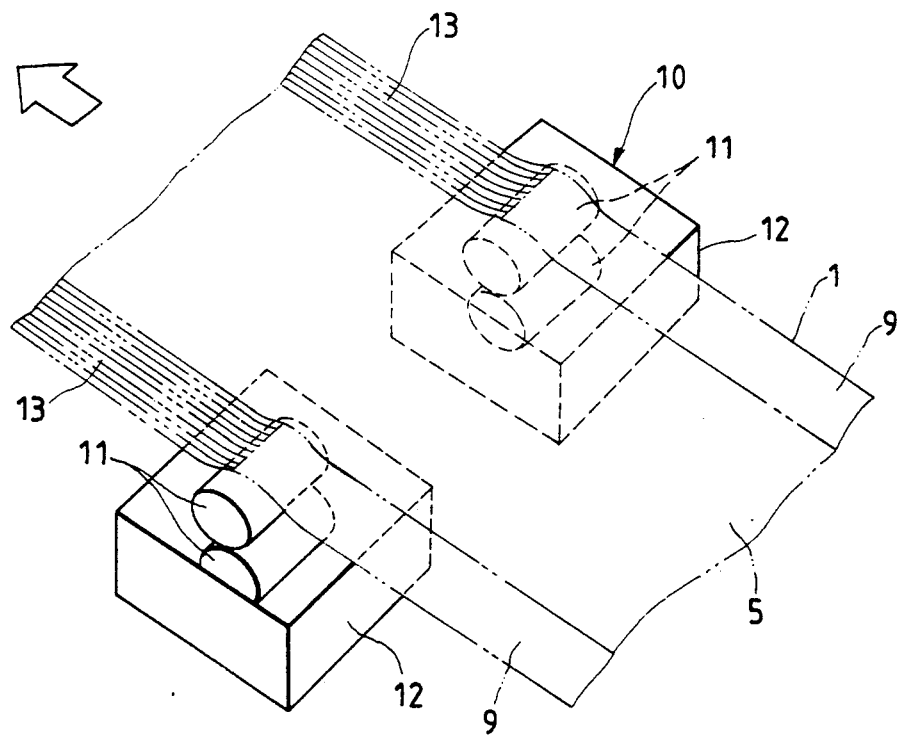
FIG. 2 is a perspective view for explaining the configuration of end-portion treating zones of FIG. 1.

FIG. 2 is a perspective view of a coating apparatus 10 constituting the end-portion treating zone 6.

The coating apparatus 10 has a configuration in which two reverse rolls 11 are provided in each of coating-liquid pans 12 provided corresponding to the opposite edge portions (portions on which the magnetic dispersion is not applied) of the web 1 on the surface side of the web to which the liquid magnetic dispersion is applied. Accordingly, as the two pairs of reverse rolls 11 rotate, various coating treating liquids 13 supplied to or remaining in the coating liquid pans 12 can be applied onto the edge portions 9.

The coating treating liquid 13 may be, for example, a solution of vinyl acetate chloride in methyl ketone, a solution of polyurethane (50,000 in molecular weight): polyisocyanate = 4:1 in methyl ketone solution, or a solution of a mixture of a carbon black dispersion and methyl ethyl ketone, or the like. Further, as the coating treating liquid 13, a fatty-acid lubricant (for example, butyl stearate) or a fluorine-group lubricant (for example, MEGAFAC F177 made by Dai Nippon Ink & Chemicals Inc.) may be used. After application, the coating treating liquid 13 is suitably dried to form a coating. In the apparatus shown in FIG. 1, the coating treating liquid 13 can be dried together with the undercoat in the undercoat drying zone 7.

As the coating treating liquid 13, alternatively, a solution of an ultraviolet (UV) setting coating material (for example, acryl epoxy) or a solution of an electron-beam (EB) setting coating material (for example, acrylic ester, acrylamide) may be used. In this case, by irradiating with ultraviolet rays or an electron beam after application of the coating treating liquid 13, a relatively fast dried and hardened coating is formed.

As the web 1 for use as a magnetic recording medium such as a magnetic tape for VTR or the like, a polyethylene terephthalate film (PET base) is generally used. In the web 1, a filler is applied onto the rear surface of the web 1 so as to cause a fine unevenness to thereby reduce the contact resistance at contact portions such as guide poles or the like of a recording/reproducing apparatus so as to make tape running stable when the magnetic recording medium is run in the magnetic recording/reproducing apparatus. Shavings adhering to a coating head or the like due to addition of the filler contain the filler ($CaCO_3$, $TiO_2$) as its main component.

Accordingly, when the above-mentioned coating, which has good sliding properties and superior durability, has been formed on the edge portions 9 of the web 1 according to the present invention, the edge portions 9 are prevented from coming into contact with a coating head of the extrusion type which applies, for example, a magnetic dispersion liquid, or the edge portions 9 are prevented from coming into unnecessary contact with a smoother. Thus, shavings are effectively prevented from being generated at the edge portions and the filler is prevented from being dislodged, thereby reducing the amount of dropout. Further, because the coating has a good lubricating property, the frictional resistance of the edge portions 9 is made smaller than that in the conventional apparatus. Accordingly, the running property of the web is improved.

According to the present invention, it is not always necessary to dispose the end-portion treating zone 6 after the undercoat coating portion 4 as shown in FIG.

1, and the end-portion treating zone 6 may be disposed before the undercoat coating portion 4. Further, the coating may be formed using a web manufacturing process prior to the coating process illustrated in FIG. 1. Further, when the coating is to be formed of a UV setting coating material or an EB setting coating material, the coating may be formed in a stage after the drying zone 7, and particularly in the case of an EB setting coating material, an electron beam can be radiated just before application of the magnetic dispersing liquid.

A description has been provided of the case where only the edge portions of the web 1 are treated. According to the present invention, however, the coating treatment may be applied across the entire width of the web using the above-described method. Further, the formation of the coating is not always limited to only one surface of the web, and the coating may be formed on each of the opposite surfaces of the web.

The present invention is also not limited to the case in which the coating is formed in the step of applying the liquid magnetic dispersion as described above, but it is a matter of course that the coating treatment may be formed in the process of manufacturing the web. If the coating is formed in such a web manufacturing process, the web is prevented from being damaged in carrying or handling the web after the web is manufactured. Accordingly, it is a matter of course that the present invention is not limited to the case where the thus manufactured web is a magnetic recording medium, but, for example, is applicable to the case where a photosensitive liquid is applied onto a web.

Further, according to the present invention, after completion of the treatment process illustrated in FIG. 1, a liquid magnetic dispersion including a lubricant is applied onto the web 1, and the lubricant evaporated from the liquid magnetic dispersion is allowed to float during the drying of the liquid magnetic dispersion in a drying chamber, so that part of the lubricant adheres in the form of a layer onto a nonmagnetic layer area on each of the opposite surfaces of the web to thereby effectively prevent shaving from being caused by a conveyer roll, particularly by a calender roll, in the web treating process subsequent to formation of the magnetic layer.

As described above, in the method according to the present invention, before, for example, a liquid magnetic dispersion is applied to a web, a dry film is formed on end portions of the web on which the dispersion is not applied, so that end portions of the web are prevented from coming into contact with the coating head, for example, of the extrusion type, with which the magnetic dispersion is applied. Accordingly, the magnetic dispersion never blots. Further, the smoother is prevented from unnecessarily touching with the end portions, so that the generation of the shaving dregs is effectively prevented at the end portions. Thus, the filler in the web is retained, thereby reducing dropout in the reproduced signal. Further, the film has a good lubricating property so as to make its friction resistance smaller than that of a conventional film so that the web running property is improved. Accordingly, very favorable coating and smoothing properties are assured for long periods of time.

Further, according to the present invention, the web, which has been subject to a coating treatment including a lubricating operation and surface hardening operation on at least end portions of each of the opposite surfaces of the web, is prevented, by the lubricating effect and the surface setting operation, from being damaged by handling such as conveying or the like after manufacture of the web or by means of guide members, etc., in running the web in a coating process.

According to the present invention, a liquid magnetic dispersion including a lubricant is applied onto the web, and the lubricant evaporated from the magnetic dispersing liquid is allowed to float in the drying chamber while the magnetic dispersion liquid is being dried so that part of the lubricant is made to adhere in the form of a layer onto the nonmagnetic layer areas on each of the opposite surfaces of the web to provide a lubricating effect due to the deposited lubricant. Accordingly, shaving caused by the conveying roll, particularly by a calender roll in the following web treating process, can be more effectively prevented.

Referring to examples, the novel effects of the present invention will be made further apparent.

EXAMPLE 1

Prior to application of a liquid magnetic dispersion, vinyl acetate chloride (1% in a methyl ketone solution) was applied onto uncoated portions where the magnetic dispersion was to be applied, while changing the quantity of application as follows, by use of the apparatus shown in FIGS. 1 and 2:

| | |
|---|---|
| Quantity of application in the dried state of the film) | 1 cc/m$^2$ (0.01 $\mu$m thick |
| Quantity of application: in the dried state of the film) | 5 cc m$^2$ (0.05 $\mu$m thick |
| Quantity of application in the dried state of the film) | 10 cc/m$^2$ (0.1 $\mu$m thick |

EXAMPLE 2

Prior to application of a liquid magnetic dispersion, a 1% methyl ketone solution of a mixture of polyurethane (having molecular weight of 50,000): polyisocyanate=4:1 was applied in an amount of 5 cc/m$^2$ onto the uncoated portions where the magnetic dispersion was to be applied, by use of the apparatus shown in FIGS. 1 and 2.

EXAMPLE 3

Prior to application of a liquid magnetic dispersion, a carbon black dispersion and methyl ethyl ketone as shown in Table 1 were mixed in a ratio of 1:1, and the mixture was applied in an amount of 5 cc/m$^2$ onto uncoated portions where the magnetic dispersion was to be applied, by use of the apparatus shown in FIGS. 1 and 2.

TABLE 1

| Composition | |
|---|---|
| carbon black | 100 weight portions |
| cellulose nitrate | 25 weight portions |
| polyurethane resin (N-2301, made by Nippon Polyurethane Industry Co., Ltd.) | 25 weight portions |
| polyester resin (CORONATE L, made by Nippon Polyurethane Industry Co., Ltd.) | 20 weight portions |
| cyclohexanone | 400 weight portions |
| methyl ethyl ketone | 250 weight portions |
| toluene | 250 weight portions |

EXAMPLE 4

Prior to application of a liquid magnetic dispersion, an UV setting coating material (acryl epoxy) or an EB setting coating material (ester acrylate) was applied onto the uncoated portions where the magnetic dispersion was to be applied, by use of the apparatus shown in FIG. 2, and then ultraviolet rays or an electron beam was radiated onto the coating so as to harden the coating into a 0.1 μm thick dried film.

EXAMPLE 5

Prior to application of a liquid magnetic dispersion, butyl stearate (contained by 0.1% in a methyl ketone solution) as a fatty-acid lubricant, and MEGAFAC 177 (made by Dai Nippon Ink & Chemicals, Inc., and contained in a 0.1% in a methyl ketone solution) were applied respectively in amounts of 5 cc/m² onto the uncoated portions where the magnetic dispersion was to be applied.

After the coating treatment in each of Examples 1–5, application of magnetic dispersion and a smoothing treatment were performed as a common treatment process common to Examples 1–5.

The magnetic dispersion had the composition as shown in Table 2, and was classified into two kinds of magnetic dispersions C1 and C2 having coercive forces Hc of 600 Oe and 800 Oe respectively. At that time, the magnetic dispersion application and smoothing were performed by use of an extrusion-type coating head and smoother of the type disclosed in Japanese Unexamined Patent Publications Nos. Sho-63-88080 and Sho-54-8646, respectively.

That is, as shown in FIG. 3, a coating head 100 constructed as disclosed in Japanese Unexamined Patent Publication No. Sho-63-88080 can apply the two kinds of the magnetic dispersions C1 and C2 at the same time. In the coating head 100, slots 101 and 102 for applying the two different kinds of the magnetic dispersions C1 and C2 are constituted by two doctor edges 104 and 105 and one back edge 106. As shown in FIG. 4, the edge surfaces of the two doctor edges 104 and 105 and the back edge 106 were arranged in such a manner that the radii of curvature $R_1$ and $R_2$ were established to be 6 mm and 8 mm, respectively, and the inclination angles $\theta_1$, $\theta_2$ and $\theta_3$ were established to be 15° and 7° and 2°, respectively. An upper layer coating and a lower layer coating were formed to a thickness of 3 μm and a thickness of 1 μm, respectively.

FIG. 5 shows a smoother 200 as disclosed in Japanese Unexamined Patent Publication No. Sho-54-8646. The smoother 200 is arranged to smooth the upper layer in the as-yet undried and unhardened condition after the upper layer (C) is coated to a thickness of 1 μm.

A polyethylene terephthalate support having a thickness of 15 μm, surface roughness Ra of 0.018 μm, and a width of 500 mm was used as the web. The magnetic dispersion was applied onto the web at a coating speed and a smoothing speed of 200 m/min across the application width of the magnetic dispersion of 480 mm (the width of each of the opposite end uncoated portions being 10 mm), and over a length of 8600 m.

TABLE 2

| (Composition) | |
| --- | --- |
| Co-γ-Fe$_2$O$_3$ (Hc: 600 Oe) | 100 weight portions |
| Co-γ-Fe$_2$O$_3$ (Hc: 800 Oe) | 100 weight portions |
| copolymer of vinyl chloride, | 15 weight portions |
| vinyl acetate and alcohol | |
| polyurethane | 10 weight portions |
| (molecular weight: 50,000) | |
| stearic acid | 2 weight portions |
| dimethyl polysiloxane | 0.2 weight portions |
| carbon (particle size: 0.01 μm) | 10 weight portions |
| aluminum | 20 weight portions |
| polyisocyanate | 6 weight portions |
| butyl acetate | 200 weight portions |
| methyl ethyl ketone | 50 weight portions |

The treatment processes respectively shown in the examples were carried out, and the shaving state at the uncoated portions of each of the samples after coating and smoothing was observed. The shaving conditions of the web after coating and smoothing are shown in FIGS. 3 and 4, in comparison with a Comparative Example wherein the uncoated portions were not subject to treatment. As seen from Tables 3 and 4, there is a significant difference between the Comparative Example and each of the Examples according to the present invention.

TABLE 3

(State after application of the magnetic dispersion)

| | Level | Results |
| --- | --- | --- |
| Example 1 | 0.01 μm | No shavings were attached to edges. |
| | 0.05 μm | No shavings were attached to edges. |
| | 0.1 μm | No shavings were attached to edges. |
| Example 2 | | No shavings were attached to edges. |
| Example 3 | | No shavings were attached to edges. |
| Example 4 | | No shavings were attached to edges. |
| Example 5 | | No shavings were attached to edges. |
| Comparative Example | | White shavings were attached at 2000 m, and attached matter became so great at 4000 m that coating became impossible |

TABLE 4

(State after smoothing)

| | Level | Results |
| --- | --- | --- |
| Example 1 | 0.01 μm | No shavings were attached to edges. |
| | 0.05 μm | No shavings were attached to edges. |
| | 0.1 μm | No shavings were attached to edges. |
| Example 2 | | No shavings were attached to edges. |
| Example 3 | | No shavings were attached to edges. |
| Example 4 | | No shavings were attached to edges. |
| Example 5 | | No shavings were attached to edges. |
| Comparative Example | | Shavings were attached to the smoother at 1000 m, and the attached matter became so great at 2000 m that the smoother surface was deteriorated at edge portions of the coating. |

What is claimed is:

1. In a method for manufacturing a magnetic recording medium in which a magnetic dispersion coating liquid is applied onto a surface of a continuously running flexible support except edge portions of said support while a slot in a coating head is pressed against the surface of said flexible support, wherein the improvement comprises the steps of:

prior to applying said coating liquid, previously applying a material selected from the group of consisting of a polymer film, a carbon dispersion, a fatty-acid lubricant, and a fluorine-group lubricant onto at least portions of said flexible support corresponding to said edge portions;

drying said material applied to said portions of said flexible support to thereby form a coating at said portions of said flexible support; and applying said coating liquid onto the surface of said flexible support.

2. In a method for manufacturing a magnetic recording medium in which a magnetic dispersion coating liquid is applied onto a surface of a continuously running flexible support except edge portions in said support while a slot of a coating head is pressed against the surface of said flexible support, wherein the improvement comprises the steps of:

prior to applying said coating liquid, previously applying an ultraviolet setting monomer liquid onto at least said edge portions of said flexible support;

irradiating said ultraviolet setting monomer liquid applied onto said flexible support with ultraviolet rays so as to form said monomer liquid into a dried coating; and applying said magnetic dispersion coating liquid onto the surface of said flexible support.

3. In a method for manufacturing a magnetic recording medium in which a magnetic dispersion coating liquid is applied onto a surface of a continuously running flexible support except edge portions in said support while a slot of a coating head is pressed against the surface of said flexible support, wherein the improvement comprises the steps of:

prior to applying said coating liquid, previously applying an electron-beam setting monomer liquid onto at least said edge portions of said flexible support;

irradiating said electron-beam setting monomer liquid applied onto said flexible support with an electron beam so as to form said monomer liquid into a dried coating; and applying said magnetic dispersion coating liquid onto the surface of said flexible support.

4. A method for manufacturing a magnetic recording medium, comprising the steps of:

forming a coating on at least edge portions of each of opposite surfaces of a flexible support, said coating being formed of a material which is selected from the group consisting of a polymer film, a carbon dispersion, a fatty-acid lubricant, and a fluorine-group lubricant;

drying said coating;

applying a liquid magnetic dispersion containing a lubricant onto central portions of said flexible support;

drying said magnetic magnetic dispersion; and causing a lubricant evaporated from said magnetic dispersion in drying said magnetic dispersion to adhere in the form of a layer onto a nonmagnetic layer area on both surfaces of said flexible support.

5. A method for manufacturing a magnetic recording medium, comprising the steps of:

forming a coating on at least edge portions of both surfaces of a flexible support, said coating being formed of an electron-beam setting liquid;

hardening said coating by irradiating said coating with an electron beam;

applying a liquid magnetic dispersion containing a lubricant onto central portions of said flexible support;

drying said magnetic dispersion; and causing a lubricant evaporated from said magnetic dispersion in drying said magnetic dispersion to adhere in the form of a layer onto a nonmagnetic layer area on said front and back surfaces of said flexible support.

6. A method for manufacturing a magnetic recording medium, comprising the steps of:

forming a coating on at least edge portions of both surfaces of a flexible support, said coating being formed of an ultraviolet setting liquid;

hardening said coating by irradiated said coating with ultraviolet rays;

applying a liquid magnetic dispersion containing a lubricant onto central portions of said flexible support;

drying said magnetic dispersion; and causing a lubricant evaporated from said magnetic dispersion in drying said magnetic dispersion to adhere in the form of a layer onto a nonmagnetic layer area on said front and back surfaces of said flexible support.

* * * * *